(12) United States Patent
Bontempi

(10) Patent No.: US 7,027,461 B1
(45) Date of Patent: Apr. 11, 2006

(54) RESERVATION/RETRY MEDIA ACCESS CONTROL

(75) Inventor: Raymond Bontempi, Jamison, PA (US)

(73) Assignee: General Instrument Corporation, Horsham, PA (US)

( * ) Notice: Subject to any disclaimer, the term of this patent is extended or adjusted under 35 U.S.C. 154(b) by 766 days.

(21) Appl. No.: 09/621,894

(22) Filed: Jul. 20, 2000

(51) Int. Cl.
*H04B 7/212* (2006.01)

(52) U.S. Cl. ............... 370/443; 370/447; 370/461; 370/468

(58) Field of Classification Search ............... 370/230, 370/253, 257, 402, 437, 443, 444, 445, 447, 370/461, 462, 468, 337, 346, 349
See application file for complete search history.

(56) References Cited

U.S. PATENT DOCUMENTS

| | | | | |
|---|---|---|---|---|
| 4,058,672 A | * | 11/1977 | Crager et al. | 370/394 |
| 4,412,326 A | * | 10/1983 | Limb | 370/448 |
| 4,500,989 A | * | 2/1985 | Dahod | 370/431 |
| 4,528,663 A | * | 7/1985 | Citta | 370/229 |
| 4,672,608 A | * | 6/1987 | Ball et al. | 370/346 |
| 4,816,825 A | * | 3/1989 | Chan et al. | 340/825.5 |
| 5,570,347 A | * | 10/1996 | Bestler et al. | 370/461 |
| 5,572,517 A | * | 11/1996 | Safadi | 370/431 |
| 5,650,997 A | * | 7/1997 | Yang et al. | 370/448 |
| 5,903,735 A | * | 5/1999 | Kidder et al. | 709/240 |
| 6,240,073 B1 | * | 5/2001 | Reichman et al. | 370/319 |
| 6,240,083 B1 | * | 5/2001 | Wright et al. | 370/348 |

* cited by examiner

*Primary Examiner*—Huy D. Vu
*Assistant Examiner*—Daniel Ryman
(74) *Attorney, Agent, or Firm*—Benjamin D. Driscoll

(57) ABSTRACT

All upstream messages that are desired to be sent from one of a plurality of settop terminals sharing a common upstream channel are segmented into data packets through an adaptation layer before sending into the upstream channel by a settop terminal, using the present invention using a hybrid of contention and reservation methodologies. If the upstream message is lengthy, a user settop terminal can request and gain exclusive control over the upstream channel and transmit the message using a reservation and self-acknowledging mechanism. In accordance with the present invention, a combination reservation mechanism and calculation method to optimize random backoff time for upstream transmission is added to conventional contention based Media Access Control methods and this embodiment to substantially enhance performance.

14 Claims, 2 Drawing Sheets

RESERVATION/RETRY MEDIA ACCESS CONTROL

BACKGROUND

The present invention relates to an enhanced contention based medium access control method and apparatus in a communication system. More particularly, the invention relates to a protocol for monitoring communication traffic on a CATV system.

Over the past few years, the availability of CATV services to individual homes has increased dramatically. CATV systems have become increasingly popular and the diversity of available services has grown. Those services now include pay per view, on-line banking, home shopping and most importantly, internet access. CATV services are no longer limited to transmitting video programs from a headend to the settop terminals. Settop terminals may download data from the headend and upload program selections and other data to the headend. Accordingly, the volume of upstream communications from settop terminals to the headend has increased since the interactive features of CATV services require realtime feedback from the settop terminals.

A typical CATV network consists of a cable plant with the headend connected to individual settop terminals through a shared medium, such as a coaxial cable or a fiber optical cable. In a typical bi-directional CATV network, the upstream channels carry information which is transmitted from the plurality of settop terminals to the headend; and downstream channels carry information which is transmitted from the headend to the settop terminals. Since the settop terminals typically share one or more upstream channels, medium access control (MAC) is needed to manage the accessibility of the upstream channels for all settop terminals sharing the channel.

It is preferable to respond to a user's demands and allocate capacity accordingly in an asynchronous or dynamic fashion. Various MAC mechanisms have been developed to address this need. ALOHA MAC was one of the first MAC techniques developed for packet radio networks. In a simple ALOHA MAC network, a sending settop terminal first sends its data frame to the MAC controller. The settop terminal then listens for a period of time equal to the maximum possible round-trip propagation delay on the network, (twice the time it takes to send a frame between the two longest physically located users), plus a small fixed time increment. If the sending settop terminal receives an acknowledgment (ACK) response from the MAC controller within that period, the transmission was successful. Otherwise, the sending settop terminal retransmits the frame. If the sending settop terminal fails to receive an ACK after repeated transmissions, it gives up.

During transmission, a frame may be corrupted due to noise on the channel or a collision, which occurs when more than one settop terminal transmits a frame at the same time and the frames on the shared channel collide. A MAC controller may determine the correctness of an incoming frame by examining a checksum. If the checksum is correct, the receiving MAC controller immediately sends out an ACK.

One problem of a network implemented with the simplest ALOHA MAC mechanism is that the system will quickly collapse when there is a rapid increase in the number of frame collisions with increased load. Therefore, the maximum utilization of the ALOHA channel approaches only about 20% under optimum network conditions of traffic load; and in practical usage it is far lower. Slotted ALOHA MAC was developed to combat this inefficiency. Slotted ALOHA MAC divides the contended network medium into uniform time slots whose size equals the frame transmission time. Each settop terminal can only transmit its message at the beginning of a time slot. The slotted ALOHA MAC increases the overall utilization of the channel, approaching 40% under perfect circumstances of network traffic. Nevertheless, a central clock or other timing technique is required to synchronize all users in such a slotted ALOHA MAC network. Such a mechanism is usually costly and complex.

Another asynchronous access control approach is frequency-division multiple access (FDMA) where different frequencies are allocated to each settop terminal. This requires a large reservation of channel bandwidth and is inefficient for terminals that are not transmitting most of the time.

Both asynchronous access control approaches provide moderate performance for constant bandwidth and latency traffic, but do not make efficient use of bandwidth and require more expensive headend control equipment. Other asynchronous approaches include round robin, reservation and collision sense (CD/CSM).

For round robin systems, such as token ring, each user settop terminal may either decline to transmit or transmit for predetermined period of time when the user is in receipt of a token that is passed around the network. The user may not transmit when the user does have the token. This technique can be very efficient if there are not many settops on the network and they have very small amounts of data to transmit. However, user settop terminals which have no data to transmit add considerable overhead to such a system.

Reservation techniques, which are best suited for stream traffic, divide the medium into time slots. A user settop terminal wishing to transmit data reserves future slots for use via a centralized controller. This mechanism requires more complex headend equipment and fails to adequately address the need of terminals to transmit bursty data of substantial length.

More complicated and complex control mechanisms such as carrier sense multiple access (CSMA) or collision detection (CD) is widely used in many networks. These systems usually require more expensive terminal hardware and suffer some of the same network breakdown problems as ALOHA, albeit at higher network utilization.

CATV networks have unique characteristics and requirements. CATV networks are bidirectional communication networks utilizing different channels to transmit upstream and downstream data. The network may have hundreds of thousands or even millions of concurrent users receiving downstream broadcast messages simultaneously, while a majority of the users do not actively utilize an upstream channel. The huge number of users and the fact that most of the time a majority of users have no need to access upstream channels make it less efficient to implement a CATV network with either a synchronous or a round robin type MAC, which inefficiently divides access time to the upstream channels among all users equally. A complicated and costly CSMA/CD type MAC or any type of MAC that requires a central clock to synchronize all users is not justified in cost or efficiency.

SUMMARY

The present invention is a MAC system for controlling the transmission capacity of a shared communication channel in a CATV network having a central headend and a plurality of settops. The system utilizes an enhanced reservation mechanism, coupled with an ALOHA type MAC as the upstream traffic control mechanism to maintain the traffic flow of information from settop terminals to the headend and to increase efficiency of use of upstream bandwidth. The settop terminal can gain exclusive access to the upstream channel for the duration of its message which will reduce collisions and increase efficiency of upstream bandwidth utilization. The present invention also includes a mechanism for minimizing the guardband times by determining optimal backoff times based on network usage to provide a more optimal usage of network bandwidth.

Objects and advantages of the present invention will become apparent after reading a detailed description of a presently preferred embodiment.

BRIEF DESCRIPTION OF THE DRAWINGS

The features of the present invention may best be understood by reference to the following description taken in conjunction with the following drawings and in the several figures of which like reference numbers identify like elements.

DETAILED DESCRIPTION OF THE PREFERRED EMBODIMENTS

The present invention is useful in CATV systems as well as any other communication system in which an optimized message MAC can increase upstream communication efficiency. The term "settop terminal" can be applied to any network terminal with the capacity to perform various features described in the present specification. The term "cable television" and CATV used in the present specification is meant to encompass all such communication systems and is not limited to television communication. Similarly, the terms "upstream receiver", "downstream transmitter" and "message router" are network functional units and are not meant to be limited to CATV systems. Each functional unit can be an individual apparatus or be a part of multi-function apparatus.

Figure 1:
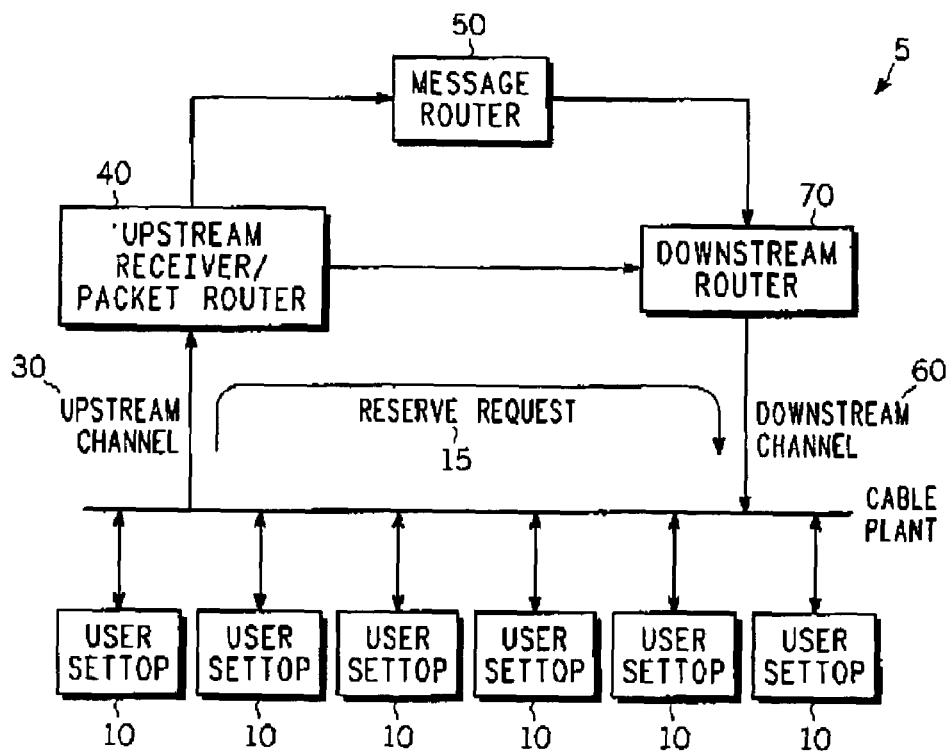
FIG. 1 is a block diagram of network data flow in the system of the present invention.

FIG. 1 illustrates the data flow block diagram in a network of one embodiment implemented the present invention. A message MAC network 5 includes one message router/headend 50, an upstream receiver 40, a downstream transmitter 70 and a plurality of settop terminals 10 sharing at least one upstream channel 30 and at least one downstream channel 60.

In the proposed mechanism, when a settop terminal 10 has data to send, it characterizes its upstream message into Type I or Type II, using the size of the upstream message or the assigned priority of each message as discriminating factors. The upstream message can be divided into several packets for transmission. A packet includes a header portion and a data portion. The header contains the packet sender's address and the packet designation address and may include other information. For example, a specific bit in the header of a packet will indicate whether it belongs to a Type I or Type II message. Type I packets are used for short "Type I messages" which fit in one or two packets. Type I packets are also used as reservation packets for Type II messages. Type II messages are long messages, relative to the size of Type I messages or other types of contention based packets.

Type I packets are used for very short messages, which can fit in a 1 or 2 packets. If there is more than one packet in a Type I message, the first packet contains the information about the total number of packets in the complete message. In one embodiment, as explained in further detail herein, in addition to transferring a small amount of data, the Type I message serves as a network command, self-acknowledging to the transmitting settop terminal 10 that the packet has reached the message router 50. This embodiment precludes the need for dedicated headend equipment to provide packet acknowledgment.

Type I message operation is as follows. When a settop terminal 10 has a small message to send upstream, a Type I upstream packet will be created in the settop terminal 10 with header bits that indicate that the packet contains the actual transmitted message. Although a Type I message may consist of several packets, for simplicity of explanation a single-packet message will be explained herein. Those of skill in the art would recognize that for a multi-packet Type I message, the same procedure would be followed for each of the subsequent packets.

After creation, the Type I packet is transmitted immediately into the upstream channel 30. The upstream receiver 40 receives the Type I packet, checks to determine the type of packet and directly forwards a copy of the packet to the downstream transmitter 70 and a copy of the packet the message router 50. The downstream transmitter 70 further forwards the Type I packet through downstream channel 60 to its group of downstream settop terminals 10. When the Type I packet originating settop terminal 10 receives back the sent packet from the downstream channel 60, the return packet serves as an acknowledgment to indicate a successful transmission.

The originating settop terminal 10 recognizes the packet as the packet that it created by examining the header, which will indicate the packet sender's address. If the transmitting settop terminal 10 does not receive this "acknowledgment" packet within a predetermined period of time, plus a guard-time, it will assume that the packet collided with a competing packet or was lost, and the settop terminal 10 will retransmit. All other settop terminals 10 will ignore this packet, recognizing it as an ACK for a Type I message. The message router 50 will forward the packet to the appropriate network destination.

Type II messages are longer and leverage the capacity enhancing aspect of the present invention. If the settop terminal 10 has a large message to send, it first calculates the amount of bandwidth 'reservation' it requires on the upstream channel in order to transmit the message in a continuous stream. A Type I reservation packet, (hereinafter "reserve request" packet), is created in the settop terminal with these values. The Type I reserve a request packet is transmitted on a contention basis directly into the upstream channel 30. As aforementioned, the upstream transmitter 40 forwards a copy of the reserve request packet 15 to the downstream transmitter 70, which further broadcasts the reserve request packet 15 through the downstream channel 60 to all of the settop terminals 10. This reserve request packet 15 will contain information on the length, (or number of packets), of the following Type II message. All settop terminals 10, other than the requesting settop terminal, receiving a reserve request command 15, will backoff from upstream transmission for an optimum period of time, which is calculated based on the size of the Type II message as indicated in the Type I reserve request packet 15, plus an additional amount of guard time. The guard time may be a fixed period of time, or a calculated period of time based on the number of current network participants, plus a randomized backoff time. Upon receipt of its originally transmitted reserve request packet, the requesting settop terminal 10 begins to transmit its Type II message after an appropriate guard time. Instead of transmitting during the "reservation period" described in the Type I reservation message, all other settop terminals 10 will queue their upstream messages.

The upstream receiver 40 receives the incoming upstream packets of either the Type I (reservation or data message) or the Type II message and forwards them to the message router 50. The message router 50 will perform data packet re-assembly, error checking and error recovery on all incoming upstream messages. The message router 50, upstream receiver 40 and downstream transmitter 70, may all be located within a headend or remote from each other, but are only required to be logically connected. Additionally, the functions of the upstream receiver 40 and the downstream transmitter 70 can be combined into one unit, and/or combined with the message router 50.

If a large message has been transmitted, there will be a queuing of pending messages in other settop terminals 10. In order to prevent a large collision after a message has been transmitted, and to minimize the number of the queued messages at each settop terminal 10, a random backoff algorithm is employed. This random backoff algorithm minimizes network congestion by taking into account the size of the previously transmitted message as well as the number of participants on the network 5. In this way, if a large message was transmitted, a longer random backoff would be provided to allow time for the presumed larger number of settop terminals 10 who may have queued during that time to dissipate their requests in an orderly fashion. Upstream bandwidth can be additionally optimized by minimizing the amount of time in the guard band that is calculated by settop terminals 10 that are queuing to transmit.

The present invention also includes a mechanism to permit settop terminals 10 on the network to have a reasonable knowledge of how many other settop terminals 10 exist on the network and, therefore, to determine an optimum backoff time. This mechanism is described in detail below.

If the number of settop terminals 10 on the network 5 are known, the backoff time can be dynamically calculated in accordance with the following algorithm. The probability that k packets will enter the network 5 in a time period $\tau$ is illustrated by the Poisson distribution shown below:

$$P(X=k)=L^k e^{(-L)}/k!  \qquad \text{Equation (1)}$$

where:
k=number of packets that will enter the network in a time $\tau$ equal to the number of packets expected per user times the number of known users;
L=total average rate of packets sent (packets/sec)=N*T;
N=average number of packets per settop;
T=number of potential packet senders on the network; and
$\tau$=amount of time reserved for the transmission of the previous message on the upstream channel (seconds).

The number of packets expected to be queued in period is equal to L. The simplest algorithm would provide a linear relationship between the number of expected packets and the average of a random backoff time such as:

$$\text{Backoff time}=L*\text{message size}+\text{guardband time}*R \qquad \text{Equation (2)}$$

where: R=a random number between 0 and 1.

As shown by Equation 1, it is important to accurately determine the number of current settop terminals 10 on the network 5 in order to maximize bandwidth usage. In one embodiment of the present invention, there is a unique method of tracking the total number of concurrent settop terminals 10 on the network 5, which uses the settop terminals 10 themselves to determine how many users are on the network 5 at any time. This method is based on having the last settop terminal 10 to "join" the network 5 increment a count of known settop terminals 10 on the network 5. These special network messages are sent the same way as the Type I messages, (i.e. they are transmitted from the settop terminal 10 to the upstream receiver 40 and sent over to the downstream transmitter 70 for receipt by all connected settop terminals 10).

In one embodiment, when a settop terminal 10 first enters the network 5, it listens for a special network message that is periodically sent from the last settop terminal 10 that entered the network 5. If the new settop terminal 10 does not hear this special message within a certain period of time, it assumes that it is the only settop terminal 10 on the network 5 and begins transmitting the special network message. In essence, the message states that there is one settop terminal 10 on the network 5. When a second settop terminal 10 enters the network 5, it listens for the network message. When it hears the message indicating that there is one settop terminal 10 on the network 5, it begins to transmit the network message indicating that two settop terminals 10 are on the network 5. When the original settop terminal 10 hears another settop terminal 10 increment the network message, it ceases its transmission but keeps track of its original network number.

When a third settop terminal 10 enters the network 5, it hears the message of the second settop terminal 10 and begins to transmit the network message indicating that three settop terminals 10 are on network 5. The second settop terminal 10 ceases transmitting the message when it hears the incremented message, but it also keeps track of its original network number. This process continues as new settop terminals 10 enter the network 5, and will permit all settop terminals 10 to know exactly how many settop terminals 10 are connected to the network 5. All settop terminals 10 that enter the network 5 will assign themselves a "network number" corresponding to their entry time onto the network 5. The network number of the settop terminal 10 that is currently transmitting the network message will be included in that message. A new settop terminal 10 will take the subsequent number. If there is a collision with a settop terminal 10 that already has that number, the colliding settop terminal 10 will send a network message to indicate collision and the new settop terminal 10 will choose the next higher number. This numbering mechanism will allow the settop terminals 10 to know who should transmit if the transmitting settop terminal 10 leaves the network; the settop terminal 10 with the next highest network number will be begin transmitting.

If a settop terminal 10 knows that it is leaving the network 5, it will issue a special network message to the rest to the settop terminals 10 indicating that it is leaving, which will indicate to the currently transmitting settop terminal 10 to decrement the total terminal count. The leaving settop terminal 10 will stop transmitting this message when it sees the current network message decrement count by one.

Periodically, the entire network 5 will need to re-establish the number of settop terminals 10 to determine the number of units which have left the network 5 or become inactive. This will determine if any settop terminals 10 have left the network 5 without announcing. In one embodiment, the currently transmitting settop terminal 10 will send a 'recount' network message. Upon receipt to this message, the original settop terminal 10 will initiate the original counting process again. It will transmit the network message indicating that there is one settop terminal 10 on the network 5. Once that is received, the second settop terminal 10 will transmit. This continues until there is a missing settop terminal. After a certain interval passes without a message from a settop terminal 10 incrementing the count, the successive settop terminal 10 will assume the number of the settop terminal 10 that has left. The successive settop terminal 10 sends out a special message indicating that it is "taking over" for the lost settop terminal 10 and that all subsequent settop terminals 10 should decrement their count by 1. If any settop terminals 10 enter or leave during this process, they can post their status at the end of the cycle.

In another embodiment, the total number of current settop terminals 10 is tracked at a communication center within the headend. Each time a settop terminal 10 enters or leaves the network 5, it will issue a message to inform the communication server to increase or decrease the total number count. The communication server will periodically send information of the updated total number of settop terminals 10 to all settop terminals 10.

When it is needed, or on a periodic basis, the communication server will reinitialize the total number by resetting the total number and requesting all on-line settop terminals 10 to send in a message for recounting purposes.

Proper calculation of packet size is also important for optimizing the network bandwidth usage. When there is a high volume of potential traffic based on a large number of potential transmitters, a smaller Type I message length will help reduce collisions. This will require that more messages will need to be sent as Type II, but should reduce collisions on the Type I messages entering the network. When potential traffic is light, the reservation message could be made longer to accommodate a reasonable payload to accommodate a larger percentage of messages without the need for a reservation cycle. The simplest method of optimizing packet size is a linear relationship between the number of potential transmitters and the optimum packet size. An example of an algorithm is:

$$P = FT \quad \text{Equation (3)}$$

where:

T=number of participants on the network;

P=packet size in ms; and

F=constant factor (tunable).

As those of skill in the art realize, other optimizing algorithms could also be used.

Figure 2:
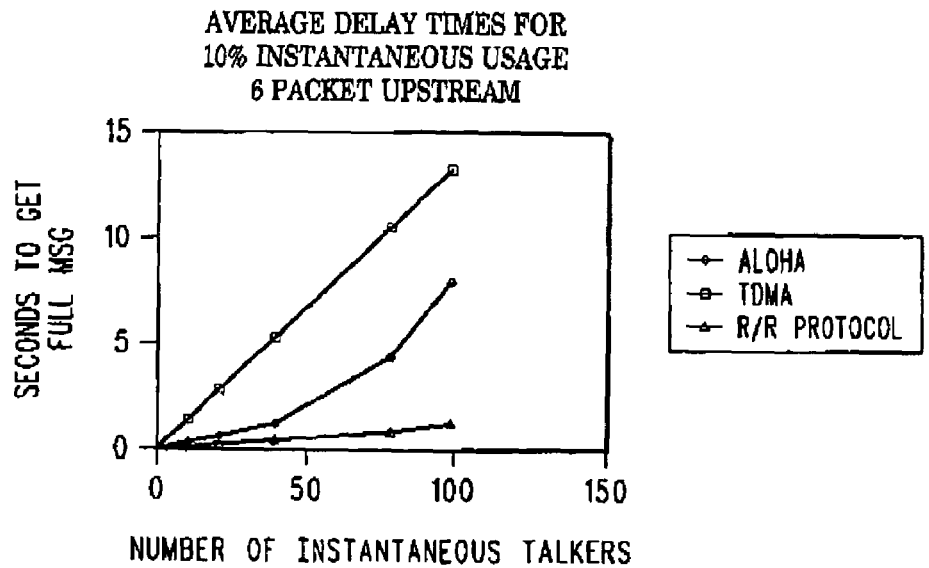
FIG. 2 is a comparison chart of the average delay time among ALOHA, TDMA and message MAC with 10% instantaneous senders.

FIG. 2 provides a comparison of message delivery times between ALOHA, TDMA and the present invention method assuming the transmission of uniform 6-data-packet messages. The X-axis is the number of settop terminals 10 concurrently sending a message and the Y-axis is the average delay time for a successfully received message. Under the simulated environment with 10% of settop terminals 10 instantaneously sending a 6-data-packet message, the present invention substantially reduces the delay time to receive a message successfully as compared to ALOHA or TDMA.

As shown in FIG. 2, for example, in a total 1000 settop terminals network with 100 instantaneous settop terminals sending a 6-data-packet message, the average delay time for a full message delivery is approximately 13–14 seconds with a TDMA implementation. It takes an average eight seconds delay time for a full message delivery with a traditional ALOHA implementation. Meanwhile, using the present invention implementation, the delay time to receive a full message is reduced to less than three seconds.

Figure 3:
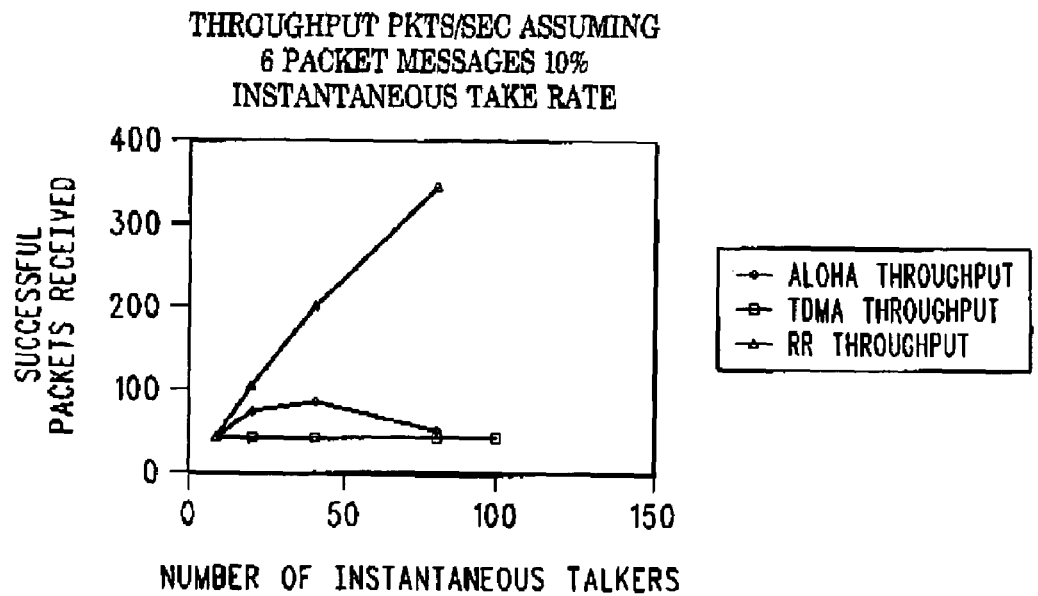
FIG. 3 is a comparison chart of the throughput of data packets per second among ALOHA, TDMA and message MAC.

FIG. 3 is a comparison of packets per second throughput between ALOHA, TDMA and the present invention assuming the transmission of 6-data-packet messages. The X-axis is the number of settop terminals concurrently sending a message. The Y-axis is the number of packets successfully received. Under the simulated environment with 10% instantaneous settop terminals 10 sending a message, the present invention significantly improves the success rate of messages received, as compared to ALOHA or TDMA.

Figure 4:
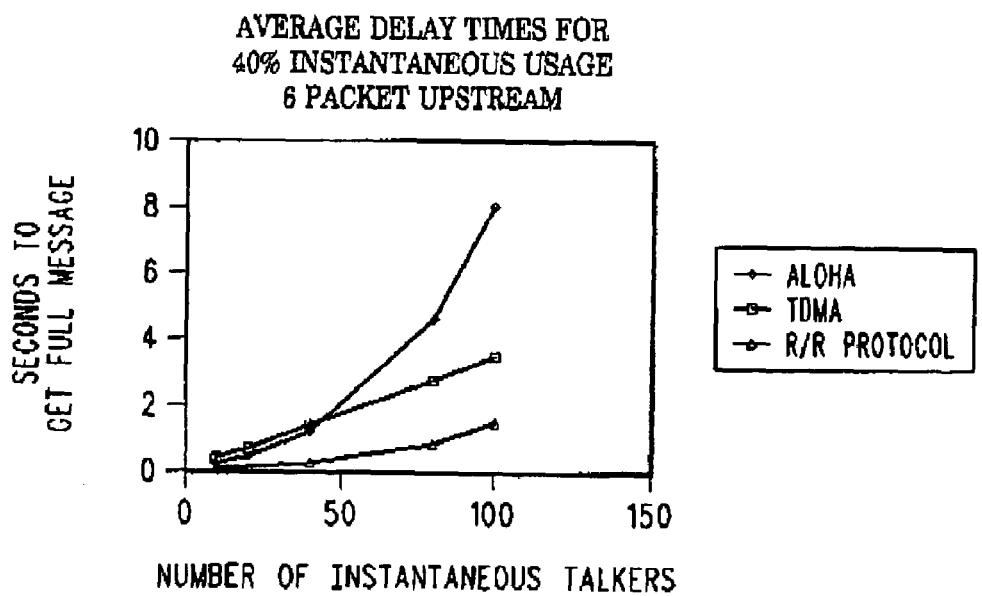
FIG. 4 is a comparison chart of the average delay time among ALOHA, TDMA and message MAC with 40% instantaneous senders.

FIG. 4 is a comparison of message delivery times per second throughput between ALOHA, TDMA and the present invention. The X-axis is the number of instantaneous settop terminals 10 sending a message and the Y-axis is the average delay time for a successfully received message. Under the simulated environment with 40% settop terminals sending a 6-data-packet message, the present invention substantially reduces the delay time to receive a message, as compared to ALOHA or TDMA. As shown in FIG. 4, with 100 instantaneous settop terminals sending a 6-data-package-message in a total 250 settop terminals network, the average delay time to receive a full 6-data-package message is eight seconds with a TDMA implementation. It takes an average three seconds to receive a full 6-data-package message with a traditional ALOHA implementation in a similar network. Under the same condition but with the present invention implementation, the delay time to receive a 6-data-package message is reduced to less than two seconds.

What is claimed is:

1. A method of providing medium access control over an upstream channel in a communication network system serving a plurality of system users, having an upstream channel for carrying upstream messages from at least a subset of the plurality of system users to a communication server and a downstream channel connecting said communication server to said system users of said subset, the method comprising:

classifying upstream user messages as a type-one or a type-two message based on a predetermined factor wherein a copy of type-one messages will be distributed from a user of the subset of users to all users in said subset of users;

for each type-two message, defining a type-one message, as a reserve request, directed to all other users in the subset of users to reserve upstream channel usage to the sending user for sending a type-two message;

said users selectively buffering said messages such that type-one messages are buffered if a reserve message has been received and type-two message are buffered until after its associated type-one message is sent and received by the other users wherein said users buffer said messages for a backoff time;

calculating the backoff time, each time said user completes an upstream transmission or receives a reserve request from another user of said subset, where said calculation is based on a plurality of factors including the message round-trip propagation time, the size of last upstream message sent by said user, and the total number of current on-line users of said subset tracked by said communication system, and tracking the total number of current on-line users of said subset wherein tracking said total number of current on-line users of said subset comprises:

periodically sending a first special message containing said total number of current on-line users of said subset by the last log-in system user into said subset;

monitoring said first special message for a predetermined period of time when a new system user first logs into said subset;

said new system user which has received said first special message starting to send periodically a second special message having said total number of current on-line users of said subset incrementing by one;

stopping sending said first special message by said last log-in system user once it has received said second special message from said new system user, said new system user becoming said last log-in system user of said subset;

sending a third special message into said system by a system user ready to log-out of said subset;

said last log-in system user which has received said third special message decrementing said total number of current on-line users of said subset by one; and resetting and recounting said total number of current on-line users of said subset if needed.

2. The method of claim 1, wherein said upstream user message contains information to identify said message sender.

3. The method of claim 2 whereby receiving a type-one message from the downstream channel by said message sender serves as an acknowledgment to indicate that other users of said subset and said communication server successfully received said type-one message.

4. The method of claim 1, wherein said upstream user message contains information to identify the designated message receiver.

5. The method of claim 4, wherein a receiver of said type-two message returns an acknowledgement to a sender of said type-two message upon successful receipt of said type-two message.

6. The method of claim 1, wherein said predetermined factor to classify the type of message is based on the size of said message.

7. The method of claim 6, wherein said type-one message, said reserve request, and said type-two message are transmitted using a standard packet cell data structure, wherein said messages can be further segmented and encapsulated into a multi-packet cell comprising a plurality of packet cells.

8. The method of claim 7, wherein said packet cell of said message further comprises at least one header portion and at least one data portion; wherein one designated bit of the header portion is set to identify said packet cell as a reserve request.

9. The method of claim 7 wherein a first packet cell of said multi-packet cell contains the total number of packet cells for said message and each said packet cell having information to identify its packet cell sequence within the multi-packet cells.

10. The method of claim 1, wherein said predetermined factor to classify type of message is based on the level of priority of said message.

11. The method of claim 1, wherein said users buffer said messages for a pre-determined period of time after receiving a reserve request.

12. A method of providing medium access control over an upstream channel in a communication network system serving a plurality of system users, having an upstream channel for carrying upstream messages from at least a subset of the plurality of system users to a communication server and a downstream channel connecting said communication server to said system users of said subset, the method comprising:

classifying upstream user messages as a type-one or a type-two message based on a predetermined factor wherein a copy of type-one messages will be distributed from a user of the subset of users to all users in said subset of users;

for each type-two message, defining a type-one message, as a reserve request, directed to all other users in the subset of users to reserve upstream channel usage to the sending user for sending a type-two message;

said users selectively buffering said messages such that type-one messages are buffered if a reserve message has been received and type-two message are buffered until after its associated type-one message is sent and received by the other users wherein said users buffer said messages for a backoff time;

calculating the backoff time, each time said user completes an upstream transmission or receives a reserve request from another user of said subset, where said calculation is based on a plurality of factors including the message round-trip propagation time, the size of last upstream message sent by said user, and the total number of current on-line users of said subset tracked by said communication system, and tracking the total number of current on-line users of said subset wherein tracking said total number of current on-line users of said subset comprises:

periodically sending a first special message containing said total number of current on-line users of said subset by the last log-in system user into said subset;

monitoring said first special message for a predetermined period of time when a new system user first logs into said subset;

said new system user which has received said first special message starting to send periodically a second special message having said total number of current on-line users of said subset incrementing by one;

stopping sending said first special message by said last log-in system user once it has received said second special message from said new system user, said new system user becoming said last log-in system user of said subset;

sending a third special message into said system by a system user ready to log-out of said subset;

said last log-in system user which has received said third special message decrementing said total number of current on-line users of said subset by one; and resetting and recounting said total number of current on-line users of said subset if needed wherein said resetting and recounting further comprises:

issuing a recounting message by said last log-in system user;

said last log-in system user issuing a first special message having a total number of current on-line users of said susbset set to be one; and the rest of said current on-line users of said subset incrementing said total number of current users of said subset by successively becoming said last log-in system user.

13. A CATV network system implementing a medium access control mechanism, having a headend, a downstream channel connecting said headend with a plurality of settop users and carrying downstream messages, and at least an upstream channel connecting said headend with a plurality of settop users and carrying upstream messages, the system comprising:

means for buffering a message and classifying said message as a type-one or a type-two message based on a predetermined factor by a message sender;

means for said message sender to transmit a copy of said buffered message into said upstream channel immediately if the message is a type-one message, and issuing a special type-one message, a reserve request, into said upstream channel immediately if said buffered message is a type-two message;

means for transferring said type-one message and said reserve request directly from said upstream channel into said downstream channel;

means for inducing other settop users which have received said reserve request from said downstream channel to refrain from transmitting into said upstream channels for a period of time equal to a reservation time plus additional guard band;

means for transmitting a copy of said buffered type-two message into said upstream channel by said reserve request sender once it has received said reserve request it sent from said downstream channel;

means for responding by said headend by sending an acknowledge to said type-two message sender to indicate successful receipt of said type-two message;

mean means for removing said buffered type-two message from buffering by said type-two message sender when it receives said acknowledge;

means for re-transmitting said message after a predetermined period of time if the number of retries has not exceeded a predetermined maximum retry count; and wherein a backoff time is calculated every time for each settop user completing transmitting said upstream message or receiving a reserve request from another user, comprising:

means for tracking the number of concurrent settop users in said communication system;

means for tracking the size of a last message sent by said sending settop user; and means for calculating the backoff time by using said number of concurrent settop users, said size of the last message and round-trip propagation time.

14. A CATV network system implementing a medium access control mechanism, having a headend, a downstream channel connecting said headend with a plurality of settop users and carrying downstream messages, and at least an upstream channel connecting said headend with a plurality of settop users and carrying upstream messages, the system comprising:

means for buffering a message and classifying said message as a type-one or a type-two message based on a predetermined factor by a message sender;

means for said message sender to transmit a copy of said buffered message into said upstream channel immediately if the message is a type-one message, and issuing a special type-one message, a reserve request, into said upstream channel immediately if said buffered message is a type-two message;

means for transferring said type-one message and said reserve request directly from said upstream channel into said downstream channel;

means for inducing other settop users which have received said reserve request from said downstream channel to refrain from transmitting into said upstream channels for a period of time equal to a reservation time plus additional guard band;

means for transmitting a copy of said buffered type-two message into said upstream channel by said reserve request sender once it has received said reserve request it sent from said downstream channel;

means for responding by said headend by sending an acknowledge to said type-two message sender to indicate successful receipt of said type-two message;

means for removing said buffered type-two message from buffering by said type-two message sender when it receives said acknowledge;

means for re-transmitting said message after a predetermined period of time if the number of retries has not exceeded a predetermined maximum retry count;

means for grouping a plurality of settop users with a downstream transmitter between said headend and said settop users;

means for grouping a plurality of users with a upstream transmitter between said headend and said settop users; and means for forwarding a copy of said type-one message from said upstream transmitter directly to said downstream transmitter wherein said type-one message will be received by said plurality of settop users grouped by said downstream transmitter.

* * * * *